(12) United States Patent
Mockridge

(10) Patent No.: US 9,926,940 B2
(45) Date of Patent: Mar. 27, 2018

(54) ROTOR ASSEMBLY

(75) Inventor: Richard Iain Mockridge, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 1478 days.

(21) Appl. No.: 13/203,155

(22) PCT Filed: Feb. 10, 2010

(86) PCT No.: PCT/GB2010/050213
§ 371 (c)(1),
(2), (4) Date: Oct. 5, 2011

(87) PCT Pub. No.: WO2010/097610
PCT Pub. Date: Sep. 2, 2010

(65) Prior Publication Data
US 2012/0014806 A1    Jan. 19, 2012

(30) Foreign Application Priority Data

Feb. 24, 2009 (GB) .................... 0903054.5

(51) Int. Cl.
*B32B 37/12* (2006.01)
*F04D 29/26* (2006.01)
*F04D 29/62* (2006.01)
*F16D 1/068* (2006.01)

(52) U.S. Cl.
CPC ......... *F04D 29/263* (2013.01); *F04D 29/622* (2013.01); *F04D 29/626* (2013.01); *F16D 1/068* (2013.01)

(58) Field of Classification Search
CPC ........ F01D 5/025; F04D 29/20; F04D 29/263; F04D 29/266; F04D 29/626; F04D 29/62; F04D 29/622; F16D 1/068

USPC ................. 416/213 R, 174; 29/889.4, 889.21
See application file for complete search history.

(56) References Cited

U.S. PATENT DOCUMENTS

| 2,433,589 A | * | 12/1947 | Adams ...................... F04D 7/06 137/312 |
| 3,565,553 A | * | 2/1971 | Rinehart et al. ......... 417/423.12 |
| 3,709,633 A | | 1/1973 | Wooden |
| 3,801,226 A | * | 4/1974 | Bevan ....................... F04D 7/04 415/201 |
| 3,884,595 A | | 5/1975 | Herrick |
| 4,427,911 A | * | 1/1984 | Manson ................... 310/156.21 |
| 4,483,660 A | | 11/1984 | Roberts |

(Continued)

FOREIGN PATENT DOCUMENTS

| DE | 10 2004 031 852 | 1/2006 |
| EP | 0 564 194 | 10/1993 |

(Continued)

OTHER PUBLICATIONS

Machine translation of JP 2008160959 A.*

(Continued)

*Primary Examiner* — Woody Lee, Jr.
(74) *Attorney, Agent, or Firm* — Morrison & Foerster LLP

(57) ABSTRACT

A rotor assembly that includes a shaft and an impeller and/or a rotor core. The shaft is secured within a bore in the impeller and/or the rotor core by an adhesive such that the concentricity of the shaft is smaller than that of the bore. A method of manufacturing the rotor assembly is also described.

14 Claims, 3 Drawing Sheets

(56) References Cited

U.S. PATENT DOCUMENTS

| | | | |
|---|---|---|---|
| 5,221,184 A * | 6/1993 | Gesenhues et al. | ....... 415/216.1 |
| 5,421,781 A | 6/1995 | Mackellar | |
| 5,632,685 A * | 5/1997 | Myers | ........................ 464/183 |
| 6,039,536 A * | 3/2000 | Van De Venne | ...... F04D 29/263 |
| | | | 415/216.1 |
| 6,534,889 B2 | 3/2003 | Katagiri et al. | |
| 6,700,256 B2 | 3/2004 | Fukutani et al. | |
| 7,913,269 B2 | 3/2011 | Takaki et al. | |
| 8,450,897 B2 | 5/2013 | Yoneyama | |
| 8,593,756 B2 | 11/2013 | Sugi et al. | |
| 8,638,526 B2 | 1/2014 | Shinji et al. | |
| 8,756,794 B2 | 6/2014 | Ions et al. | |
| 2002/0084704 A1 | 7/2002 | Fukutani et al. | |
| 2003/0168064 A1* | 9/2003 | Daly et al. | ............... 128/204.18 |
| 2005/0239558 A1* | 10/2005 | Brandt et al. | ................... 464/89 |
| 2008/0011266 A1 | 1/2008 | Staudenmaier et al. | |
| 2008/0199319 A1* | 8/2008 | Mause et al. | ................. 416/185 |
| 2009/0001826 A1* | 1/2009 | Suzuki et al. | ................... 310/42 |
| 2009/0245707 A1* | 10/2009 | Schmidt et al. | ............. 384/537 |
| 2010/0181875 A1 | 7/2010 | Tamaoka et al. | |
| 2010/0215485 A1 | 8/2010 | Childe et al. | |
| 2010/0215491 A1 | 8/2010 | Mockridge et al. | |
| 2011/0033282 A1* | 2/2011 | Streich | ........................... 415/135 |
| 2011/0044810 A1 | 2/2011 | Ions | |
| 2012/0049662 A1 | 3/2012 | Ions | |
| 2012/0092792 A1 | 4/2012 | Sugi et al. | |
| 2012/0201682 A1 | 8/2012 | Dymond et al. | |
| 2013/0052019 A1 | 2/2013 | Ions et al. | |
| 2013/0223997 A1 | 8/2013 | Childe et al. | |

FOREIGN PATENT DOCUMENTS

| | | |
|---|---|---|
| EP | 0 905 382 | 3/1999 |
| GB | 775807 | 5/1957 |
| GB | 2 113 016 | 7/1983 |
| GB | 2467967 | 8/2010 |
| GB | 2467969 | 8/2010 |
| JP | 61-190580 | 8/1986 |
| JP | 2-7841 | 1/1990 |
| JP | 2-184236 | 7/1990 |
| JP | 7-59294 | 3/1995 |
| JP | 8-319993 | 12/1996 |
| JP | 2003-328984 | 11/2003 |
| JP | 2006-353100 | 12/2006 |
| JP | 2007-255420 | 10/2007 |
| JP | 2008-160959 | 7/2008 |
| JP | 2008160959 A * | 7/2008 |
| JP | 2010-196705 | 9/2010 |
| WO | WO-90/10816 | 9/1990 |
| WO | WO-2010/097610 | 9/2010 |

OTHER PUBLICATIONS

Technical Drawing for Engineering Communication, Goetsch et al., Nov. 2008, pp. 472-473.*

GD&T basics, http://www.gdandtbasics.com/concentricity, retrieved Nov. 2016.*

GB Search Report dated Apr. 28, 2011, directed towards GB Patent Application No. 1102132.6; 1 page.

GB Search Report dated Jun. 2, 2009 directed towards GB Patent Application No. 0903054.5; 2 pages.

International Search Report and Written Opinion dated May 25, 2010 directed towards International Patent Application No. PCT/GB2010/050213; 10 pages.

Dymond et al., U.S. Office Action dated Feb. 4, 2014, directed to U.S. Appl. No. 13/367,765; 14 pages.

Dymond et al., U.S. Office Action dated Sep. 18, 2013, directed to U.S. Appl. No. 13/367,765; 18 pages.

Dymond et al., U.S. Office Action dated Jun. 19, 2014, directed to U.S. Appl. No. 13/367,765; 12 pages.

Dymond et al., U.S. Office Action dated Nov. 7, 2014, directed to U.S. Appl. No. 13/367,765; 17 pages.

Dymond et al., U.S. Office Action dated Oct. 7, 2015, directed to U.S. Appl. No. 13/367,765; 14 pages.

Dymond et al., U.S. Office Action dated May 5, 2016, directed to U.S. Appl. No. 13/367,765; 17 pages.

* cited by examiner

US 9,926,940 B2

ROTOR ASSEMBLY

REFERENCE TO RELATED APPLICATIONS

This application is a national stage application under 35 USC 371 of International Application No. PCT/GB2010/050213, filed Feb. 10, 2010, which claims the priority of United Kingdom Application No. 0903054.5, filed Feb. 24, 2009, the entire contents of which are incorporated herein by reference.

FIELD OF THE INVENTION

The present invention relates to a rotor assembly for a compressor.

BACKGROUND OF THE INVENTION

FIG. 1 illustrates an example of a rotor assembly 1 in which an impeller 2 has been press fit onto a shaft 3. Owing to tolerances associated with the manufacture of the impeller 2, the bore 4 into which the shaft 3 has been press fit is misaligned. The misalignment of the bore 4, which has been exaggerated for the purposes of illustration, adversely affects the performance of the compressor. In order to minimize possible misalignment, the impeller 2 and shaft 3 are typically manufactured using high-precision processes that achieve tight tolerances. However, high-precision manufacturing is expensive and precludes the use of certain materials and processes that are otherwise not capable of achieving the necessary tolerances.

SUMMARY OF THE INVENTION

In a first aspect, the present invention provides a rotor assembly comprising a shaft and an impeller, the shaft being secured within a bore of the impeller by an adhesive such that the tolerance in the concentricity of the shaft relative to a centerline of the impeller is smaller than the concentricity of the bore relative to the centerline.

By using adhesive to secure the shaft with the bore of the impeller, a rotor assembly having tighter tolerances in concentricity may be achieved without the need for high-precision manufacturing. The rotor assembly may therefore be manufactured more cheaply. Moreover, the components of the rotor assembly may be manufactured using materials and processes that would otherwise be precluded form use owing to their associated tolerances.

Preferably, the ratio of the concentricities of the shaft and the bore is no greater than 0.9. This then corresponds to an improvement in concentricity of 10%. Advantageously, the concentricity of the shaft is no greater than 0.07 mm.

The radius of the shaft may have a first tolerance, the radius of the bore may have a second tolerance, and the concentricity of the bore may have a third tolerance. The nominal radius of the bore is then ideally greater than the nominal radius of the shaft by at least the sum of the first, second and third tolerances. Accordingly, the bore is of sufficient radius that the shaft may be secured within the bore such that it has a tighter concentric tolerance than that of the bore.

Preferably, the rotor assembly comprises an impeller and a rotor core, and the shaft is secured within a bore in each of the impeller and the rotor core by adhesive. The tolerances in the concentricity of the shaft relative to the impeller and the rotor core are then smaller than the tolerances in the concentricity of the bores in the impeller and rotor core respectively. This then has the advantage that balancing of the rotor assembly is made easier since the impeller and rotor core, which each provide a significant moment of inertia, have tighter concentricities with the shaft and with each other.

Advantageously, the rotor assembly comprises a bearing cartridge located between the impeller and the rotor core. This then provides a compact design of rotor assembly that may be dynamically balanced as a complete unit. The bearing cartridge, which ideally comprises a pair of spaced bearings surrounded by a sleeve, provides a single fastening of relatively large surface area over which the rotor assembly may be secured to a frame, housing or the like. In having the impeller and rotor core located on opposite sides of the bearing cartridge, radial loading of each of the bearings may be more evenly balanced, thereby prolonging the life of the bearing cartridge.

The impeller may be formed of plastic, thereby providing a cheap, lightweight impeller for which a relatively tight concentricity may nevertheless be achieved.

The rotor core may be formed of a rare-earth magnetic material. This then has the advantage of providing excellent magnetic properties. Since the concentricity of the shaft relative to the rotor core is improved, balancing of the rotor assembly is made easier. This is particularly useful when the rotor core is formed of a rare-earth magnetic material, since mass cannot easily be removed from the rotor core owing to the brittle nature of the material.

In a second aspect, the present invention provides a rotor assembly comprising a shaft, an impeller, a rotor core and a bearing assembly, wherein the impeller and the rotor core are secured to the shaft at opposite ends of the shaft and the bearing cartridge is secured to the shaft between the impeller and the rotor core, and the shaft is secured within a bore of at least one of the impeller and the rotor core by an adhesive such that the concentricity of the shaft is smaller than that of the bore.

In a further aspect, the present invention provides a method of manufacturing a rotor assembly comprising: providing a shaft; providing at least one of an impeller and a rotor core; and adhering the shaft within a bore in the at least one impeller and rotor core such that the tolerance in the concentricity of the shaft relative to the at least one impeller and rotor core is smaller than that of the bore, wherein adhering the shaft to the bore comprises applying an adhesive to the shaft and inserting the shaft into the bore while rotating the shaft relative to the impeller or rotor core.

The method has the advantage of providing good adhesive coverage between the shaft and the impeller or rotor core, thereby ensuring a good join.

The method may comprise mounting each of the shaft and the impeller or rotor core in one half of a jig, the two halves of the jig being aligned. The method would then further comprise bringing the two halves of the jig together while rotating one half of the jig relative to the other half of the jig. By rotating one half of the jig relative to the other half, as the two halves are brought together, good adhesive coverage between the shaft and impeller or rotor core is provided.

The radius of the shaft may have a first tolerance, the radius of the bore may have a second tolerance, and the concentricity of the bore may have a third tolerance. The step of providing at least one of the impeller and rotor core would then preferably comprise providing at least one of the impeller and rotor core with a bore of nominal radius greater than the nominal radius of the shaft by at least the sum of the first, second and third tolerances. A bore is then provided of sufficient radius that the shaft may be secured within the bore such that it has a tighter concentric tolerance than that of the bore. More preferably, the method includes providing the impeller or rotor core with a bore of nominal radius that is greater than the nominal radius of the shaft by at least the sum of the first, second and third tolerances and a nominal radial gap. Accordingly, at the worst tolerance condition, a radial gap exists between the shaft and the bore that encourages wicking of the adhesive.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
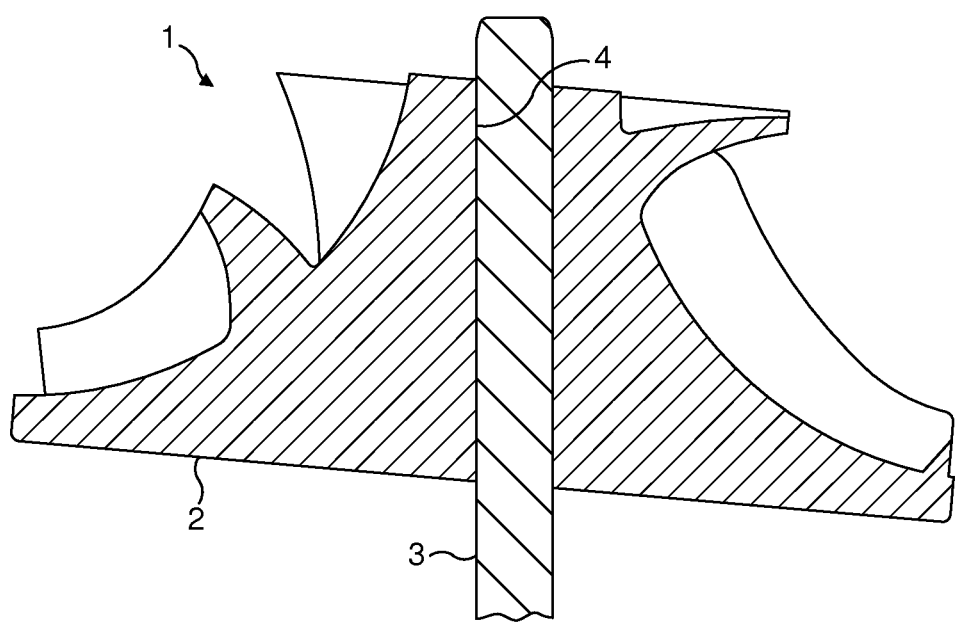
FIG. 1 is a sectional view of a rotor assembly having a misaligned impeller.
Figure 2:
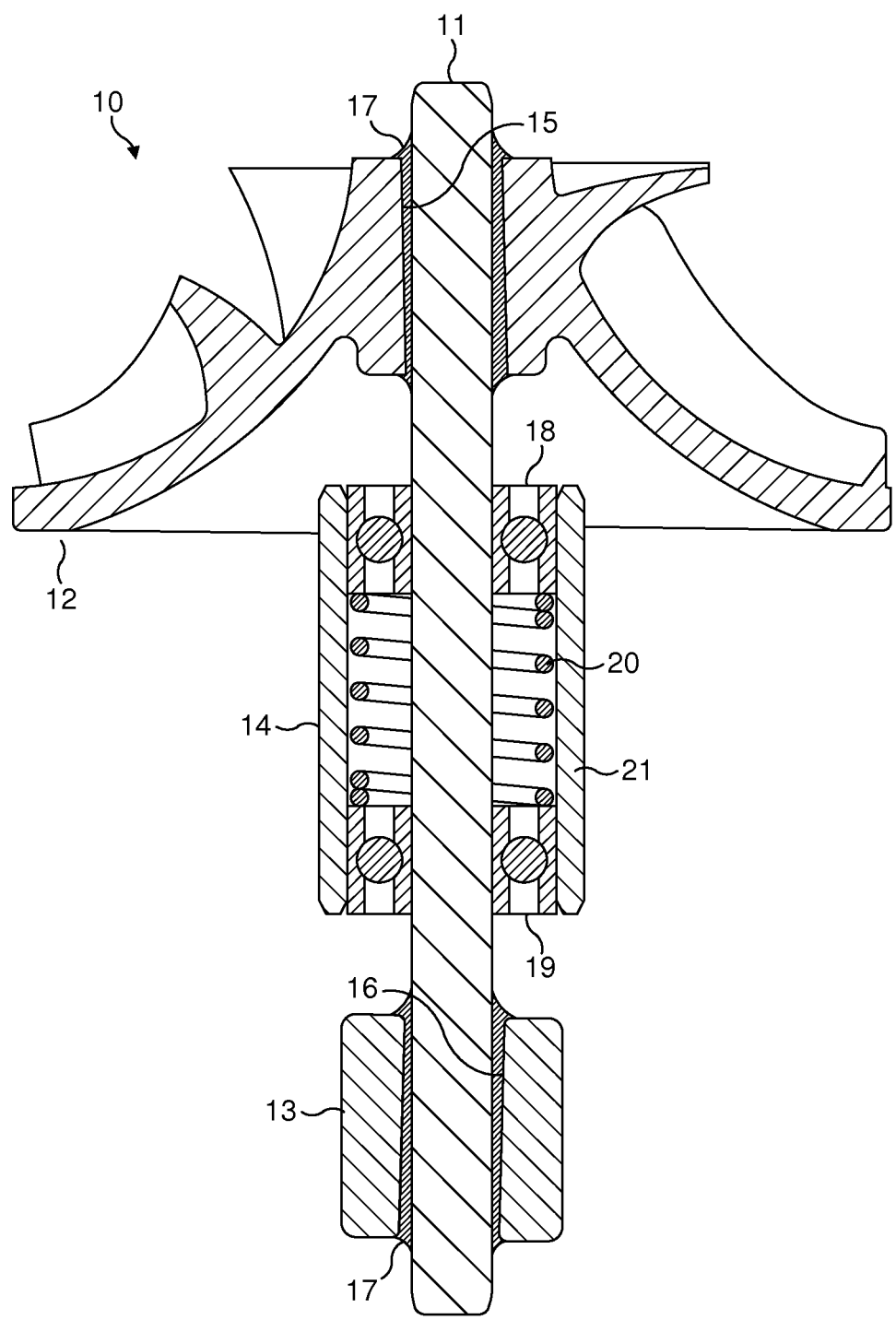
FIG. 2 is a sectional view of a rotor assembly in accordance with the present invention.

The rotor assembly 10 of FIG. 2 comprises a shaft 11, an impeller 12, a rotor core 13 and a bearing cartridge 14. The impeller 12 and rotor core 13 are secured to the shaft 11 at opposite ends of the shaft 11. The bearing cartridge 14 is secured to the shaft 11 between the impeller 12 and the rotor core 13.

The impeller 12 includes a bore 15 into which the shaft 11 is secured by means of an adhesive 17. Owing to tolerances in the manufacture of the impeller 12, the bore 15 has a tolerance in concentricity relative to a centerline of the impeller 12. The shaft 11 similarly has a tolerance in concentricity relative to a centerline of the impeller 12. However, the shaft 11 is secured within the bore 15 such that the tolerance in the concentricity of the shaft 11 is smaller than that of the bore 15.

The impeller 12 illustrated in FIG. 2 is a centrifugal impeller. However, other types of impeller might equally be employed according to the intended application of the rotor assembly 10.

The rotor core 13 comprises a cylindrical body formed of a hard or soft magnetic material. As with the impeller 12, the rotor core 13 includes a bore 16 into which the shaft 11 is secured by means of an adhesive 17. Again, owing to tolerances in the manufacture of the rotor core 13, the bore 16 has a tolerance in concentricity relative to a centerline of the rotor core 13. The shaft 11 similarly has a tolerance in concentricity relative to a centerline of the rotor core 13. However, the shaft 11 is secured within the bore 16 such that the tolerance in the concentricity of the shaft 11 is smaller than that of the bore 16.

Although the rotor core 13 illustrated in FIG. 2 comprises a single cylindrical body, the rotor core 13 might equally be formed of a plurality of stacked rings, each ring comprising a bore into which the shaft 11 is secured by an adhesive 17.

The bearing cartridge 14 comprises a pair of spaced bearings 18,19, a spring 20, and a sleeve 21. The spring 20 surrounds the shaft 11 and applies a preload to each of the bearings 18,19. The sleeve 21 surrounds the bearings 18,19 and the spring 20, and provides a surface over which the rotor assembly 10 may be secured to a frame, housing or the like of a compressor. In having two spaced bearings 18,19, the bearing cartridge 14 provides effective support for the rotor assembly 10. By locating the impeller 12 and rotor core 13 on opposite sides of the bearing cartridge 14, radial loading of each of the bearings 18,19 is more evenly balanced, thereby prolonging the life of the bearings 18,19.

Figure 3:
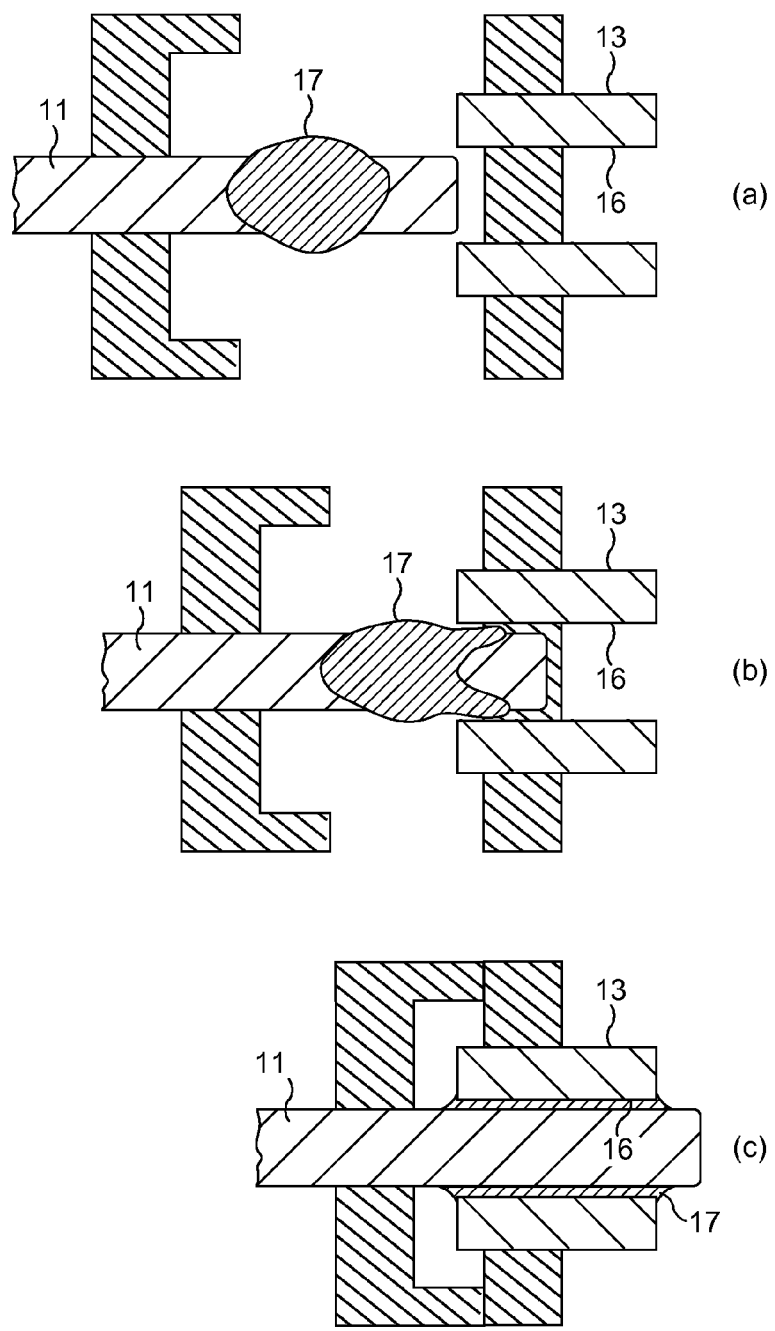
FIG. 3 illustrates certain stages in the manufacture of the rotor assembly of FIG. 2 in which (a) adhesive is applied to a shaft, (b) the shaft is partially inserted into a rotor core, and (c) the shaft is fully inserted into the rotor core.

A method of manufacturing the rotor assembly 10 will now be described with reference to FIG. 3.

The bearing cartridge 14 is first secured to the shaft 11. The manner in which the bearing cartridge 14 is secured to the shaft 11 is not pertinent to the present invention. By way of example only, the bearings 18,19 may be press fit onto the shaft 2 and the sleeve 22 may then be press fit or adhered over the bearings 18,19. Unlike the impeller 12 and rotor core 13, the bearing cartridge 14 is manufactured to tight tolerances. Consequently, when secured to the shaft 11, the tolerance in the concentricity of the shaft 11 relative to the bearing cartridge 14 is relatively small.

The rotor core 13 is then secured to one end of the shaft 11. This is achieved by mounting the shaft 11 in one half of a jig, and mounting the rotor core 13 in the other half of the jig. The two halves of the jig are aligned such that the shaft 11 and rotor core 13 are concentric. Referring now to FIG. 3, a spot of adhesive 17 is applied to the shaft 11 at a short distance from the free end of the shaft 11, FIG. 3(a). The two halves of the jig are brought together such that the shaft 11 is inserted into the bore 16 of the rotor core 13. The shaft 11 is inserted up to a point at which the rotor core 13 contacts the spot of adhesive 17. On contacting the adhesive 17, capillary action causes the adhesive 17 to be drawn into the bore 16 between the rotor core 13 and the shaft 11, FIG. 3(b). At this stage, further insertion of the shaft 11 into the bore 16 may be halted for a time to allow for sufficient adhesive 17 to be drawn into the bore 16. Insertion of the shaft 11 into the bore 16 then continues at a speed that achieves good coverage of adhesive 17 between the shaft 11 and the rotor core 13. If the speed at which the shaft 11 is inserted is too fast, air may become trapped by the adhesive 17 as it wicks around the bore 16 at different points along the length of the bore 16. On the other hand, if the speed at which the shaft 11 is inserted is too slow, the adhesive 17 may begin to cure, which in turn increases the viscosity and reduces the wicking of the adhesive 17. Since insufficient coverage may result in subsequent failure of the adhesive 17, the speed of insertion of the shaft 11 is ideally controlled so as to achieve good adhesive coverage.

As the two halves of the jig are brought together and the shaft 11 is inserted into the bore 16, one half of the jig is rotated relative to the other half. This then causes the shaft 11 to rotate relative to the rotor core 13, thereby encouraging a more even distribution of adhesive 17 between the shaft 11 and the rotor core 13. Finally, after the shaft 11 has been fully inserted into the bore 16 of the rotor core 13, FIG. 3(c), relative movement of the two halves of the jig is halted and the adhesive 17 is cured (e.g. by UV light).

The impeller 12 is then secured to the free end of the shaft 11. The manner in which the impeller 12 is secured to the shaft 11 is almost identical to that of the rotor core 13. However, owing to the particular design of rotor assembly 10 illustrated in FIG. 2, it is not possible to directly hold the shaft 11 when mounting the shaft 11 in one half of the jig; this is because the only free part of shaft 11 is the end to which the impeller 12 is to be secured. Accordingly, when mounting the shaft 11 in the jig, the bearing cartridge 14, rather than the shaft 11, is directly held by the jig. The impeller 12 is otherwise secured to the shaft 11 in the same manner as that described above for the rotor core 13. In particular, a spot of adhesive 17 is applied to the shaft 11, one half of the jig is rotated relative to the other half, and the two halves of the jig are brought together such that the shaft 11 is inserted into the bore 15 of the impeller 12. Again, the speed of translation and rotation of one half of the jig relative to the other half is controlled so as to achieve good coverage of adhesive 17 between the shaft 11 and the impeller 12. After the shaft 11 has been fully inserted into the bore 15 of the impeller 12, relative movement of the two halves of the jig is halted and the adhesive 17 is cured.

When securing the impeller 12 to the shaft 11, the bearing cartridge 14 is directly held by the jig. Alternatively, the rotor core 13 might be directly held by the jig. However, the outer diameter of the bearing cartridge 14 typically has a tighter tolerance than that of the rotor core 13; this is particularly true when the rotor core 13 is formed of a sintered or bonded magnetic material for which relatively tight tolerances are difficult to achieve. It is for this reason that the bearing cartridge 14, rather than the rotor core 13, is ideally held when securing the impeller 12 to the shaft 11. Nevertheless, when holding the bearing cartridge 14, the jig also holds or otherwise applies a frictional force to the rotor core 13. This then ensures that the shaft 11 rotates relative to the impeller 11, rather than the bearing cartridge 14, as the two halves of the jig are brought together.

For the particular design of rotor assembly 10 illustrated in FIG. 2, it is not possible to hold the shaft 11 directly in the jig when securing the impeller 12. Nevertheless, for alternative designs of rotor assembly, it may be possible to hold the shaft 11 directly. For example, the shaft 11 of the rotor assembly 10 of FIG. 2 might be lengthened so as to protrude beyond the end of the rotor core 13. As a further example, the bearing cartridge 14 may be spaced from the rotor core 13 so as to expose a portion of the shaft 11 that can then be held by the jig.

Although the rotor core 13 is initially secured to the shaft 11, subsequently followed by the impeller 12, the order by which the impeller 12 and rotor core 13 are secured to the shaft 11 is not essential. The impeller 12 might equally be secured to the shaft 11 before the rotor core 13. However, since the impeller 12 is generally larger than the rotor core 13, assembly is typically easier if the smaller item is secured first to the shaft 11.

Reference has been made above to the speeds of translation and rotation of the shaft 11 relative to the bores 15,16 of the impeller 12 and rotor core 13. The speeds of translation and rotation are ideally chosen so as to achieve a good coverage of adhesive 17 between the shaft 11 and the impeller 12 or rotor core 13. The speeds of translation and rotation will therefore depend upon several factors, particularly the viscosity of the adhesive 17, the curing rate of the adhesive 17, the radius of the shaft 11, and the radial gap between the shaft 11 and the bore 15,16. By way of example only, for a shaft radius of 1.5 mm, a radial gap of 0.1 mm and an adhesive viscosity of 400-600 mPa·s (Brookfield RVT, spindle 2 at 20 rpm, 25° C.), speeds of between 0.6-0.7 m/s for translation and 10-20 rpm for rotation have been found to provide good adhesive coverage.

As the radial gap between the shaft 11 and bore 15,16 increases, the volume of air needed to be driven out by the adhesive 17 increases. Consequently, the speed at which the shaft 11 is inserted into the bore 15,16 is ideally decreased so as to reduce the likelihood of air entrapment. In addition to a slower shaft insertion speed, a larger gap naturally requires more adhesive 17. Not only does this increase cost but it also increases the length of time necessary to cure the adhesive 17 and potentially leads to a weaker joint. Accordingly, the gap between the shaft 11 and the bore 15,16 is ideally no bigger than that necessary to achieve good wicking and thus good adhesive coverage. As is explained below, the bores 15,16 of the impeller 12 and rotor core 13 are sized so to permit concentric insertion of the shaft 11 into the bores 15,16. Accordingly, the radius of each bore 15,16 is greater than that of the shaft 11 by an amount that accounts for the tolerance stack. The size of the radial gap between the shaft 11 and each bore 15,16 will therefore be influenced by the size of the tolerance stack.

The radius of each of the shaft 2 and the bores 15,16 has a tolerance. Additionally, there is a tolerance associated with the concentricity of each bore 15,16. In order that the shaft 11 can be inserted into each bore 15,8 such that the shaft 11 is concentric with the impeller 12 and the rotor core 13, the nominal radius of each bore 15,16 is greater than the nominal radius of the shaft 11 by at least an amount that accounts for the radial and concentric tolerances. Consequently, if the shaft 11 has a nominal radius of s and a tolerance of $\pm \Delta s$, the bore 15,16 has a radial tolerance of $\pm \Delta b$, and the concentricity of the bore 15,16 has a tolerance of $\pm \Delta c$, then the nominal radius of the bore, r, may be represented as: $r \geq s + \Delta s + \Delta b + \Delta c$.

The impeller 12 and rotor core 13 are likely to be manufactured to different tolerances. Consequently, the radii of the bores 15,16 in the impeller 12 and rotor core 13 are likely to be different.

In a worst case tolerance condition, the shaft 11 may contact the wall of a bore 15,16. At the point of contact, no adhesive will be present between the shaft and bore 15,16. A minimal radial gap, g, might therefore be introduced in order to ensure that adhesive is provided around the full circumference and length of the shaft 11. The nominal radius of the bore 15,16 would then be increased to take into account the minimal radial gap, i.e. $r \geq s + \Delta s + \Delta b + \Delta c + g$ When assembling the rotor assembly 10, the two halves of the jig are concentrically aligned. Nevertheless, there are geometric tolerances associated with the alignment of the jig. Consequently, when the two halves of the jig are brought together, there is a tolerance in the concentricity of the shaft 11 relative to the centerlines of the impeller 12 and the rotor core 13. Nevertheless, the tolerance in the concentricity of the shaft 12 is smaller than that of each of the bores 15,16 in the impeller 12 and the rotor core 13.

For the rotor assembly 10 described above, the shaft 11 has an outer diameter of 3.0025±0.0025 mm. The bore 15 in the impeller 12 has a diameter of 3.25±0.10 mm and a tolerance in concentricity of 0.09 mm. The bore 16 in the rotor core 13 has a diameter of 3.22±0.075 mm and a tolerance in concentricity of 0.08 mm. The shaft 11 is secured within the bore 15 of the impeller 12 such that it has a tolerance in concentricity of 0.07 mm, which is smaller than that of the bore 15. Additionally, the shaft 11 is secured within the bore 16 of the rotor core 13 such that it has a tolerance in concentricity of 0.07 mm, which is again smaller than that of the bore 16.

The ratio of the tolerances in the concentricity of the shaft 11 and the bore 15 in the impeller 12 is 0.78, representing an improvement in concentricity of 22%. The ratio of the tolerances in the concentricity of the shaft 11 and the bore 16 in the rotor core 13 is 0.875, representing an improvement in concentricity of 12.5%. Consequently, with the method of manufacture described above, it is possible to achieve an improvement in concentricity of at least 10%, which equates to a ratio in the concentric tolerances of the shaft and bore of no more than 0.9. Moreover, it is possible to achieve tolerances in the concentricity of the shaft of 0.7 mm or smaller.

By providing an oversized bore into which a shaft is adhered, the rotor assembly 10 of the present invention achieves improved concentricity without the need for high-precision manufacturing. Consequently, the rotor assembly 10 may be manufactured more cheaply. Moreover, the rotor assembly 10 may be manufactured using materials and processes that would otherwise be precluded form use owing to their associated tolerances. In particular, the impeller 12 may be formed of a plastic, which is typically cheaper and lighter than a metal equivalent.

The rotor core 13 may be formed of a rare-earth magnetic material. Rare-earth magnets exhibit excellent magnetic properties. However, the magnets are generally brittle and cannot be easily press fit onto a shaft. The present invention provides a method of manufacturing a rotor assembly 10 in which rare-earth magnets can be secured to the shaft 11 in a manner that ensures relatively tight concentricity. This then simplifies balancing of the rotor assembly 10, which is of importance when using rare-earth magnets since material cannot easily be removed from the magnets owing to the brittle nature.

The rotor assembly 10 of FIG. 2 is particularly compact in design. This is achieved by securing a bearing cartridge 14 between the impeller 12 and the rotor core 13, which are secured to the shaft 11 at opposite ends. In addition to being compact in design, the rotor assembly 10 may be dynamically balanced as a complete unit prior to inclusion within a compressor. This in contrast to other rotor assemblies in which the rotor must be assembled within the compressor. Moreover, by providing a rotor assembly 10 in which tighter concentricities are achieved between the shaft 11, impeller 12 and rotor core 13, balancing of the rotor assembly 10 is made easier.

The invention claimed is:

1. A rotor assembly comprising a shaft, at least one impeller, and a rotor core, the shaft being adhered within a bore of the at least one impeller and the rotor core by the method comprising:
    adhering the shaft within a bore in the at least one impeller and rotor core by an adhesive such that the concentricity of the shaft relative to the at least one impeller and rotor core is smaller than that of the bore, and wherein the adhesive is applied to an outer surface of the shaft.

2. The rotor assembly of claim 1, wherein the ratio of the concentricities of the shaft and the bore is no greater than 0.9.

3. The rotor assembly of claim 1, wherein the impeller is formed of plastic.

4. The rotor assembly of claim 1, wherein the concentricity of the shaft is no greater than 0.07 mm.

5. The rotor assembly of claim 1 wherein the concentricity of the shaft relative to a centerline of the impeller is smaller than the concentricity of the bore in the impeller relative to the centerline of the impeller, and the concentricity of the shaft relative to a centerline of the rotor core is smaller than the concentricity of the bore in the rotor core relative to the centerline of the rotor core.

6. The rotor assembly of claim 5, wherein the rotor assembly comprises a bearing cartridge located between the impeller and the rotor core.

7. The rotor assembly of claim 5, wherein the rotor core is formed of a rare-earth magnetic material.

8. A method of manufacturing a rotor assembly comprising:
    providing a shaft;
    providing at least one of an impeller and a rotor core; and
    adhering the shaft within a bore in the at least one impeller and rotor core such that the concentricity of the shaft relative to the at least one impeller and rotor core is smaller than that of the bore,
    wherein adhering the shaft within the bore comprises applying an adhesive to the shaft and inserting the shaft into the bore while rotating the shaft relative to the at least one impeller and rotor core.

9. The method of claim 8, wherein the method comprises mounting each of the shaft and the at least one impeller and rotor core in one half of a jig, the two halves of the jig being aligned, and bringing the two halves of the jig together while rotating one half of the jig relative to the other half of the jig.

10. The method of claim 8, wherein the radius of the shaft has a first concentricity, the radius of the bore has a second concentricity the bore has a third concentricity, and the method comprises providing at least one of the impeller and rotor core with a bore of nominal radius greater than the nominal radius of the shaft by at least the sum of the first, second and third concentricities.

11. The method of claim 10, wherein the method comprises providing at least one of the impeller and rotor core with a bore of nominal radius greater than the nominal radius of the shaft by at least the sum of the first, second and third concentricities and a nominal radial gap that encourages wicking of the adhesive between the shaft and bore.

12. The method of claim 8, wherein the ratio of the concentricities of the shaft and the bore is no greater than 0.9.

13. The method of claim 8, wherein the concentricity of the shaft is no greater than 0.07 mm.

14. A rotor assembly comprising a shaft, an impeller, a rotor core and a bearing assembly, wherein the impeller and the rotor core are secured to the shaft at opposite ends of the shaft and the bearing cartridge is secured to the shaft between the impeller and the rotor core, and the shaft is secured within a bore of at least one of the impeller and the rotor core by the method comprising:
    adhering the shaft within a bore in the impeller and the rotor core by an adhesive such that the concentricity of the shaft relative to the one impeller and rotor core is smaller than that of the bore, and wherein the adhesive is applied to an outer surface of the shaft.

* * * * *